Sept. 26, 1967             F. J. JOHN             3,344,343
RETAINED CAPACITY INDICATOR WITH
MICROCOULOMETER AND THERMISTOR Filed Sept. 2, 1966                           2 Sheets-Sheet 1

INVENTOR,
FERDINAND J. JOHN
BY
*Harry M. Saragovitz*
ATTORNEY.

Sept. 26, 1967
F. J. JOHN
3,344,343
RETAINED CAPACITY INDICATOR WITH
MICROCOULOMETER AND THERMISTOR
Filed Sept. 2, 1966
2 Sheets-Sheet 2
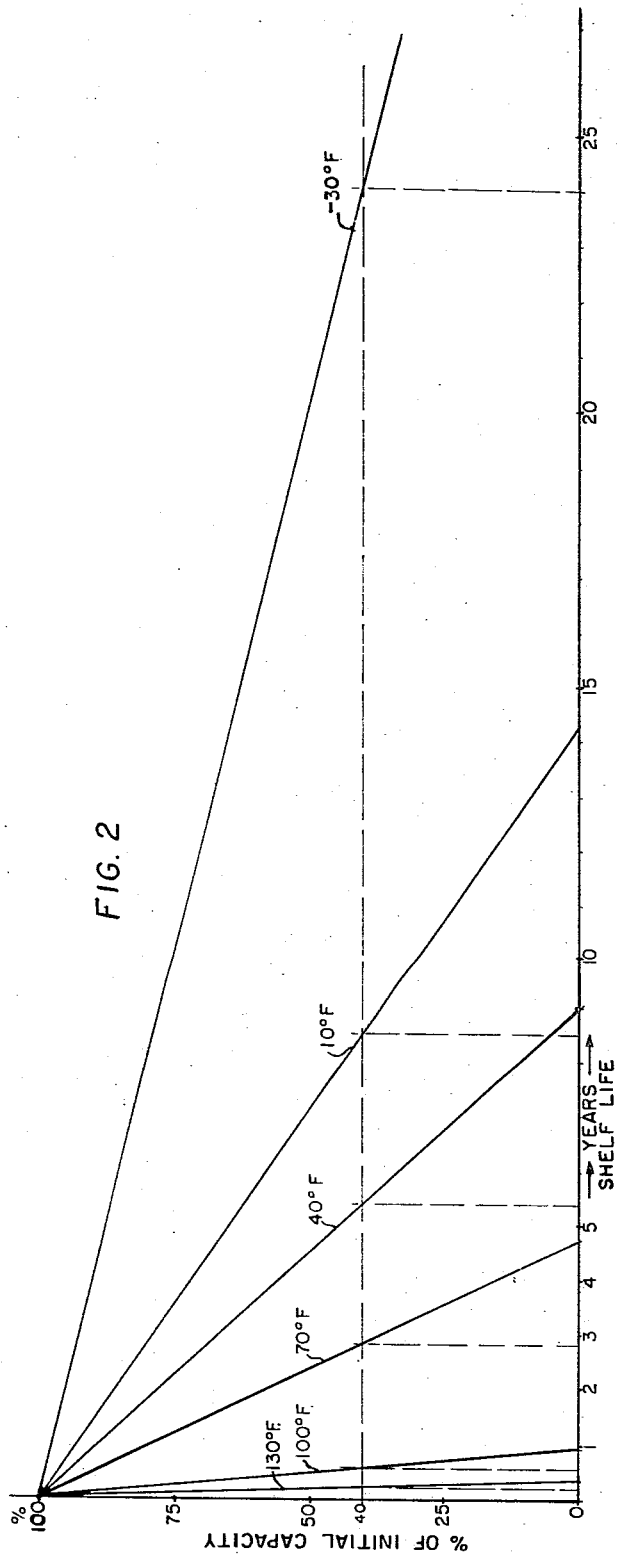
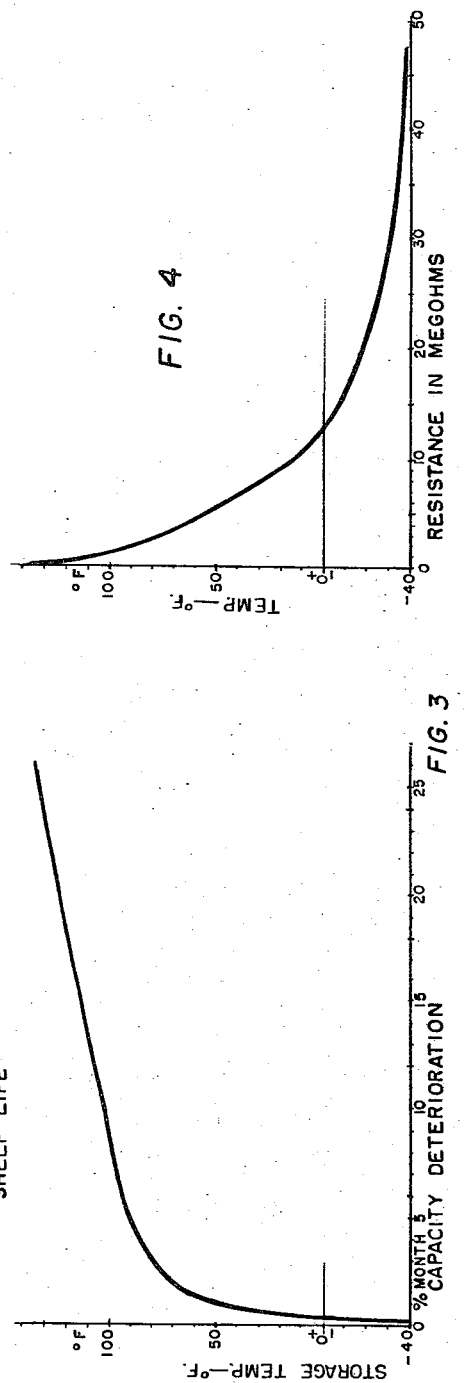
INVENTOR,
FERDINAND J. JOHN
BY *Harry M. Saragovitz*
ATTORNEY.

United States Patent Office 3,344,343
Patented Sept. 26, 1967

3,344,343
RETAINED CAPACITY INDICATOR WITH MICROCOULOMETER AND THERMISTOR
Ferdinand J. John, Colts Neck, N.J., assignor to the United States of America as represented by the Secretary of the Army
Filed Sept. 2, 1966, Ser. No. 582,792
5 Claims. (Cl. 324—29.5)

This application is a continuation-in-part of the application of Ferdinand J. John, Ser. No. 213,835, filed July 31, 1962, for Retained Capacity Indicator, now abandoned.

This invention relates to a battery retained capacity indicator which, when connected across the battery at full capacity, will indicate the percentage of original capacity retained at any particular time during storage and prior to actual use of said battery and which contains means for controlling the current flowing through the indicator, thereby providing an indication which reflects the retained battery capacity at all storage temperatures.

As is well known in the battery art, the capacity of a primary battery is a measure of the capability of the battery to discharge current through a fixed resistor for a period of time before its terminal voltage drops below a predetermined voltage. The capacity of a battery usually is measured by noting the period of time required for the closed circuit voltage to drop to a predetermined level of voltage, usually some percentage of the original voltage, when discharged through a specified load resistor at a specified temperature. The size and type of dry cell or battery and the conditions of service will determine the kind of capacity test to be used. The retained capacity of a dry battery is the number of service hours the battery will yield under specific load conditions, such as size of load resistor, loading schedule, ambient temperature and final voltage.

When batteries are stored for a period of time, capacity deterioration inevitably occurs. As can be shown from data taken from a given type of battery, this capacity deterioration is related to the temperature at which the batteries are stored. Data taken on such batteries indicates that the capacity deterioration rate is higher with increased storage temperature.

In accordance with the invention, a miniature ampere-hour meter or microcoulometer connected in series with a thermistor across the terminals of a battery to be checked; the microcoulometer is fabricated, for example, from capillary glass tubing which contains a mercury anode separated from a mercury cathode by a small electrolyte gap consisting of an aqueous solution containing a mercury salt. When the battery voltage is applied, current flow through the microcoulometer transfers mercury quantitatively across the gap, whereby the gap moves along the tube at a rate which is dependent upon current. In other words, the greater the current passing through the indicator, the shorter the time taken for the indicating gap to move from one end of the indicator to the other.

For a given microcoulometer, the full scale movement of the gap will require a predetermined and fixed number of ampere-hours $M$ so that when a current of $I$ amperes flows through the microcoulometer the length of time $h$ in hours that current must flow for a full scale movement of the gap can be determined from the relationship $M = Ih$ or $h = M/I$.

From the relationship between storage temperature $t$ and capacity depreciation one can determine the time $h$ required for the capacity of the battery to depreciate to a predetermined percentage of the initial capacity, say for example, 40% of initial capacity. At some storage temperature $t_1$, this time may be represented as $h_1$. Now, if the $M$ ampere-hours are required for full scale movement of the gap of the microcoulometer, then at storage temperature $t_1$ the current $I_1$ which must flow through the microcoulometer will be given by $I_1 = M/h_1$.

In the device of the invention, a thermistor is placed in series with the microcoulometer across the battery whose capacity deterioration is to be determined. The given type battery will, of course, have a certain terminal voltage $V$. The time to be taken for the indicating gap to move full scale at storage temperature $t_1$ is $h_1$ and the current that must flow through the microcoulometer is $I_1$. Hence, the resistance of the circuit (which is essentially the resistance of the thermistor, since the resistance of the microcoulometer and the rest of the circuit is negligible) can be determined from the relationship $R_1 = V/I_1$, that is, at temperature $t_1$ the thermistor resistance must be $R_1$.

Similarly, at a storage temperature $t_2$ the time for battery capacity deterioration to reach said predetermined level will be a new value $h_2$ and the current necessary for full scale deflection of the microcoulometer gap will become $I_2 = M/h_2$. The resistance $R_2$ that must be offered by the thermistor will now be given by $R_2 = V/I_2$. Likewise, the resistance which must be offered by the thermistor at various other temperatures can be calculated and the required characteristics of the thermistor determined. From this data, a curve of thermistor resistance versus temperature can be obtained. From the foregoing comments, it is obvious that, were it not for the use of a thermistor whose resistance changes inversely, but not linearly with temperature, the indication of retained capacity provided by the use of a microcoulometer in shunt with the battery would be erroneous, since changes in the ambient temperature of the storage place of the battery would result in negligible changes in current flow in the microcoulometer and, consequently, improperly indicated gap movement.

Having now obtained the temperature versus resistance characteristic for a thermistor necessary to control the current through the microcoulometer at various storage temperatures, it is now feasible to obtain a thermistor meeting this characteristic by design techniques well known to those skilled in the thermistor art. Many thermistor characteristics have been obtained by thermistor manufacturers and various physical properties of thermistors can be varied in order to produce a thermistor of the desired characteristic. For example, a proper selection of raw materials, the degree of sintering, grain size, and method of making contact all play a part in the thermistor resistance versus temperature curve. Since heat treatment affects the dispersion of impurities in solids, the conductivity of some types of semiconductors frequently may be changed radically in response to heat treatment.

The invention, consequently, relates to a retained capacity indicator which may be connected across a battery during storage and which will give a true indication of the percentage of original capacity retained in spite of changes in ambient storage temperature.

Other objects and uses of the invention will become apparent upon examination of the specification and the drawings wherein:

FIG. 2 shows curves of percent of initial capacity versus storage time for different specified ambient storage temperatures;

FIG. 3 is a curve showing the relationship between storage temperature and the capacity deterioration rate for a battery having the characteristics shown in FIG. 2; and FIG. 4 is a curve showing the relationship between temperature and resistance for a thermistor which will provide proper microcoulometer current control for the battery having the characteristics shown in FIGS. 2 and 3.

Figure 1:
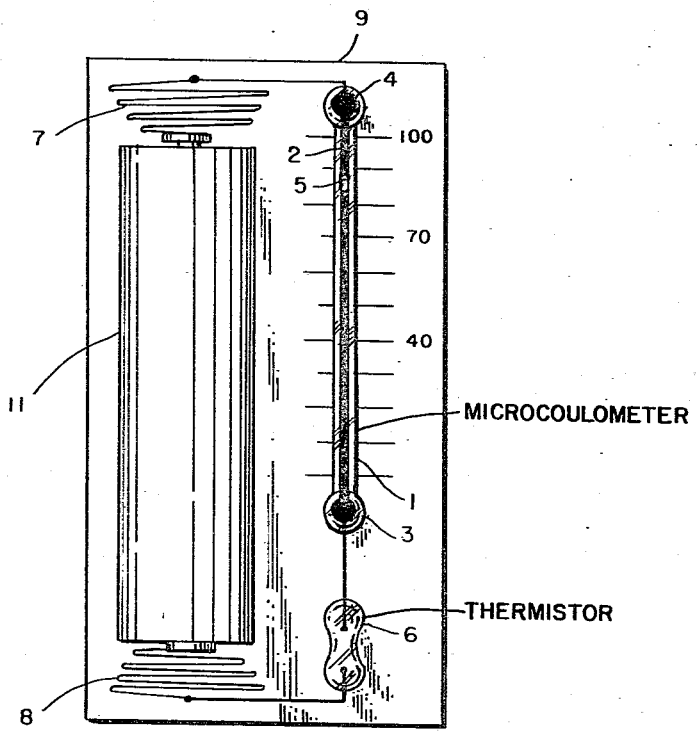
FIG. 1 is a circuit diagram showing an embodiment of the invention.

The retained capacity indicator shown in FIG. 1 consists of a microcoulometer 1 connected in series with a thermistor 6 across the terminals of a battery 11; and the battery 11 is inserted between electrical contact means 7 and 8. The microcoulometer comprises an elongated capillary glass tubing 2 similar to that used in mercury thermometers. A mercury anode 3 is disposed at one end of the glass tube and is separated from a mercury cathode 4 by a small liquid electrolyte gap 5. The microcoulometer may be a Model 150 miniature ampere-hour meter designed by Curtis Instruments, Inc. of Mount Kisco, N.Y. The gap 5 may be an aqueous electrolyte solution containing a mercury salt in a supporting electrolyte solution. Operation of the microcoulometer is based on Faraday's law of electrolysis which states that the amount of chemical decomposition produced by current is proportional to the quantity of electricity passed. When a voltage is applied to the terminals of the microcoulometer, current flow transfers mercury quantitatively across the gap, thereby moving the gap 5 along the tube at a rate determined by Faraday's law. The displacement of the electrolyte gap 5 along the tube length is a direct indication of the current-time integral. The movement rate of the electrolyte gap 5 may be determined, for a given microcoulometer, as so many milli-inches per milli-ampere hour. Based on this content, it is possible to calibrate the tube of the microcoulometer to represent either time or the percentage of retained capacity. The mircocoulometer 1 is calibrated in the embodiment of FIG. 1 in percentage of initial capacity of the battery down to 40% of full capacity for full scale movement of the indicating gap 5. Scale markings may be provided either on the tube 2 or on the frame 9 (which is only schematically indicated in FIG. 1) which serves as a mounting means for the microcoulometer 1 and the thermistor 6.

In order to more fully explain the operation of the device of the invention, reference will first be made to the curves of FIG. 2 which show characteristics for a typical Leclanche type dry cell. If one takes as the end of storage time 40% of initial capacity as accepted by the United States Department of the Army, it will be noted that, at 130° F. storage temperature, the curve of FIG. 1 reaches 40% of initial capacity at about 2.5 months. A full scale movement of the gap in the referenced microcoulometer occurs for 0.0108 ampere-hour, that is, when the product of current in amperes and the time in hours reaches 0.0108. In order to cause a full scale movement of the microcoulometer gap to indicate the low end of capacity reached in 2.5 months ($h_{130}$=2.5×30×24 hours), a current $I_{130}$ must flow through the microcoulometer; this current $I_{130}$ is given by $$I_{130}=0.01080/2.5\times30\times24=0.0108/18,000=0.000006$$

ampere.

The voltage across the thermistor-microloulometer circuit is that of the battery and, for a typical Leclanche type cell, the voltage can be 1.50 volts. Hence, the resistance $R_{130}$ of the circuit is given by $$R_{130}=1.50/.000006=250,000$$

ohms. In other words, the resistance presented by the thermistor to the circuit must be 250,000 ohms when the ambient storage temperature is 130° F.

Similarly, when the ambient temperature is 100° F., the storage time, to 40% of initial capacity, as shown in the curves of FIG. 2, is approximately 6.7 months $$(h_{100}=6.7\times30\times24 \text{ hours})$$

In such a case, the current $$I_{100}=.0108/6.7\times30\times24=0.00000224$$

ampere. For a voltage of 1.5 volts, this represents a resistance $R_{100}$ which is given by $$R_{100}=1.500/0.00000224=670,000$$

ohms. In other words, a storage temperature of 100° F. calls for a thermistor resistance of 670,000 ohms in series with the microcoulometer. Likewise, the resistance which must be presented by the thermistor at other ambient temperatures of storage can be calculated, knowing the storage time for each ambient temperature. Results which have been calculated for the temperature shown in the curves of FIG. 2 are tabulated in Table I.

TABLE I

| Storage time (to 40% of Initial Capacity), mo. | Temperature During Storage, ° F. | Thermistor Resistance Required, ohms | Capacity Deterioration Rate (Percent/mo.) |
| --- | --- | --- | --- |
| 2.5 | 130 | 250,000 | 24.0 |
| 6.7 | 100 | 670,000 | 8.6 |
| 34.0 | 70 | 3,400,000 | 1.76 |
| 64.0 | 40 | 6,400,000 | 0.94 |
| 104.5 | 10 | 10,450,000 | 0.57 |
| 288.0 | −30 | 28,800,000 | 0.208 |

The current and resistance values for various ambient temperatures are listed in Table II.

TABLE II

| Temperature, ° F. | Current (microamperes) | Thermistor Resistance (megohms) |
| --- | --- | --- |
| 130 | 6.00 | 0.25 |
| 100 | 2.24 | 0.67 |
| 70 | 0.44 | 3.40 |
| 40 | 0.235 | 6.40 |
| 10 | 0.144 | 10.43 |
| −30 | 0.052 | 28.8 |

The thermistor characteristic corresponding to the values given in Table I is shown in FIG. 3.

The curve of battery deterioration rate versus storage temperature corresponding to the values shown in Table I is shown in FIG. 4 of the drawing.

Analysis of the curves shown in FIGS. 3 and 4 indicates that the curves of FIGS. 3 and 4 have substantially inverse characteristics. In FIG. 3, the resistance of the thermistor at low temperatures is relatively high and this resistance decreases as the temperature of storage increases. On the other hand, the rate of deterioration of capacity of the primary battery at low temperatures is low and increases rapidly, but not linearly, as the storage temperature increases.

In regard to the temperature versus resistance characteristic, the thermistor resistance changes with temperature in a manner such that the ratio of the resistance $R_a$ of the thermistor at a given temperature $t_a$ and the thermistor resistance $R_o$ at some reference temperature $t_o$ is equal to the inverse of the ratio of the battery deterioration rate $D_a$ at temperature $t_a$ and the battery deterioration rate $D_o$ at the reference temperature $t_o$.

For example, if the thermistor resistance at 70° F. ($t_o$) were $R_{70}$, the thermistor resistance at temperature $t_a=100°$ F. were $R_{100}$, the battery deterioration rate at 70° F. were $D_{70}$ and the battery deterioration rate at 100° F. were $D_{100}$, the following relationship exists:

$$\frac{R_{100}}{R_{70}} = \frac{1}{\frac{D_{100}}{D_{70}}} = \frac{D_{70}}{D_{100}}$$

The current through the electrical circuit including the microcoulometer and the thermistor will change with changes in temperature to bear a relationship to the deterioration occurring in the battery, thereby causing the movement and position of the indicating gap of said microcoulometer to bear a direct relationship to the rate of the deterioration and the retained capacity, respectively, of said battery.

It should be noted that, although it is not customary to rate the capacity of primary batteries in terms of ampere-hours, the ampere-hour rating of dry batteries ranges from about 0.100 ampere-hour (for the smallest cylindrical cell) up to 60 ampere-hours (for the largest cylindrical cell). Obviously, the 0.0108 ampere-hour taken for the thermistor-microcoulometer circuit is negligible and does not appreciably affect the performance of batteries connected in the circuit. The natural variations among batteries for all but the very small batteries will exceed 0.0108 ampere-hour. This retained capacity determining circuit connected across the battery does not cause any appreciable discharge of the battery or any substantial reduction in capacity, even though it is so connected. Essentially the only deterioration is that resulting from the inherent shelf life deterioration at the ambient storage temperatures.

It should be noted that the internal resistance of a battery connected in the circuit according to the invention will not change appreciably owing to the very small current drawn by the battery; consequently, the terminal voltage of the battery will remain substantially constant during the storage period.

What is claimed is:

1. A battery retained capacity indicator for indicating the useful remaining capacity of a stored battery comprising terminal means across which said battery is connected, a microcoulometer and a thermistor connected in series with said microcoulometer between said terminal means, said thermistor being at the temperature of the battery, the rate of deterioration of capacity of said battery increasing non-linearly with storage temperature and the resistance of said thermistor decreasing non-linearly with temperature, wherein said thermistor has a resistance at the temperature of said battery equal to the ratio of the rated voltage of said battery and the current flowing at the temperature of said battery.

2. A battery retaining capacity indicator as recited in claim 1 wherein said microcoulometer includes an envelope containing therein an anode and a cathode separated by a small electrolyte movable along said envelope.

3. A battery retained capacity indicator for indicating the useful remaining capacity of a stored battery comprising terminal means across which said battery is connected, a microcoulometer having movable indicating means and a calibrated scale for indicating the percent of retained capacity of said battery, said movable indicating means traversing a prescribed portion of said scale when a predetermined quantity of electricity passes through said microcoulometer, said battery discharging to a preselected percent of initial capacity after a time interval corresponding to a given storage temperature of said battery, and a thermistor in series with said microcoulometer for maintaining the current through said microcoulometer at a value for said given temperature equal to the ratio of said predetermined quantity of electricity and the aforesaid time interval corresponding to said given temperature.

4. A battery retained capacity indicator as recited in claim 3 wherein said thermistor has a resistance at said given temperature equal to the ratio of the rated voltage of said battery and the current flowing at the temperature of said battery.

5. A battery retained capacity indicator for indicating the useful remaining capacity of a stored battery comprising terminal means across which said battery is connected, an electrical circuit consisting of a microcoulometer having movable indicating means and a thermistor connected in series with said microcoulometer between said terminal means, said thermistor being at the temperature of the battery, said battery having a predetermined relationship between temperature and rate of deterioration of battery capacity, said thermistor having temperature versus resistance characteristic such that the resistance of the thermistor changes with changes in temperature so that the ratio of the resistance of the thermistor at a given temperature and the resistance of the thermistor at a reference temperature is equal to the reciprocal of the ratio of the battery deterioration rate at said given temperature and the battery deterioration rate at said reference temperature, the current through said electrical circuit changing with temperature changes to bear a relationship with the deterioration of capacity of said battery, the movement and position of the movable indicating means of said microcoulometer bearing a direct relationship to the rate of capacity deterioration and the retained capacity respectively of said battery.

No references cited.

RUDOLPH V. ROLINEC, *Primary Examiner.*

C. F. ROBERTS, *Assistant Examiner.*